Oct. 6, 1964  K. E. PELTZER  3,152,321
HIGH FREQUENCY TRANSDUCING APPARATUS
Filed April 12, 1961
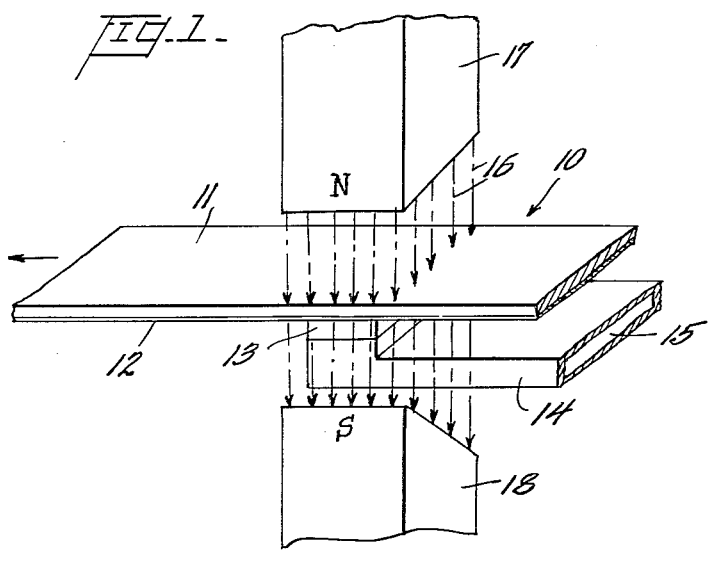
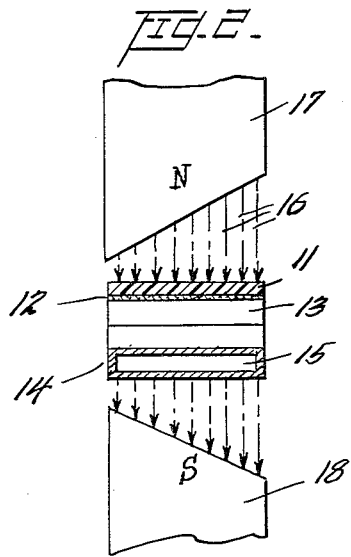
INVENTOR
*Kenneth E. Peltzer,*
BY *Alfred B. Levine*
ATTORNEYS

3,152,321
HIGH FREQUENCY TRANSDUCING APPARATUS
Kenneth E. Peltzer, College Park, Md., assignor to Litton Systems, Inc., College Park, Md.
Filed Apr. 12, 1961, Ser. No. 102,429
12 Claims. (Cl. 340—173)

This invention generally relates to the conversion or transducing of radiant microwave beams by spin resonance technology and is particularly concerned with processes and apparatus for directly recording the beam on a heat sensitive record member.

Very generally according to the invention, there is provided a transducing process and apparatus wherein a time variable, radiant microwave beam is directly applied to either continuously or discontinuously illuminate the same given mass of spin resonance material occupying a dispersed surface region. The mass of resonance material is simultaneously subjected to a magnetic field in the illuminated region having an intensity sufficient to tune or presensitize the mass into resonant energy absorbing relationship with the frequencies of the beam whereby energy from the beam is absorbed in the mass. The energy being absorbed by the mass is converted or transduced into the form of heat that is reradiated from the mass, thereby creating a heat image corresponding to the frequencies of the beam. According to the invention, the process is controlled such that the absorption of the radiant beam does not destroy the resonant condition of the mass and the heat images are thus periodically generated and will decay with the continued application and removal, or change, in the illuminating microwave beam thereby to produce a time sequence of heat patterns or images in the mass corresponding to variations in the illuminating beam.

The heat images being produced are recorded on a conventional heat sensitive tape or other suitable record member, or may be otherwise employed for display, memory, storage or the like, as desired. To record the successive heat images on an elongated heat sensitive tape, the mass of spin resonant material may be successively applied to different frames or regions along the tape by continuously or continually moving the tape into heat transferring relationship with the mass while the mass is maintained stationary. Alternatively, the resonant mass may be continuously or continually moved with respect to a stationary tape or record member. In both instances, the mass is successively brought into heat transferring relation with different positions on the heat sensitive member, or applied to different heat sensitive members, thereby to transfer the heat images being produced to the record member and effect recordings thereof.

According to further features of the invention, the magnetic field being applied to the mass is made non-homogenous over the illuminated region to provide a different intensity magnetic field at different positions on the mass. This nonuniform intensity field serves to selectively render the different positions responsive to different frequencies of the radiant beam whereby the different frequency components in the radiant beam are separated and selectively absorbed at different positions or locations on the mass, according to the nonuniform pattern of the magnetic field. In converting the absorbed energy into a heat image, the mass reradiates heat in the same pattern thereby to produce a spatially dispersed heat image corresponding to the spectrum of frequencies of the radiant beam. Since the radiant beam is continuously or discontinuously applied to the same absorptive mass, the spectral heat images being produced correspondingly change as the frequency components of the beam change. Thus the transducing process and apparatus produces a time sequence of different spatial heat images corresponding to variations in the radiant beam thereby to capture the intelligence of the radiant beam as spectral frequency recordings on a tape or record member.

It is accordingly a principal object of the invention to provide a transducing process and apparatus for directly converting a radiant microwave beam into a more usable form for recording, display and other purposes.

A further object is to provide such a process and apparatus wherein the heat images may be recorded on conventionally available heat sensitive tape or the like.

Other objects and additional advantages will be more readily understood by those skilled in the art after a detailed consideration of the following specification taken with the accompanying drawing wherein:

FIG. 1 is a perspective view of an apparatus and recording tape for practicing the invention, and FIG. 2 is a sectional view of the apparatus of FIG. 1, viewed from the right hand side thereof.

Referring now to the drawings for a detailed consideration of the invention, there is generally shown in FIGS. 1 and 2, a mass of spin resonant material 13 illustrated as being in the form of a rectangular shaped block of solid material, that is positioned in between the opposing north and south poles 17 and 18 of a permanent magnet thereby to continuously be subjected to magnetic flux 16 from the magnet.

The resonant mass 13 is adapted to be continuously or discontinuously illuminated by a radiant microwave beam over its undersurface, by means such as guiding the radiant beam through a hollow waveguide 14, leading from some position 15 externally of the recording zone and having an opening (not shown) underneath the resonant block 13 and coextensive with its undersurface, as shown. Thus in the recording zone intermediate the magnet poles 17 and 18, the mass of spin resonant material 13 is simultaneously subjected to the magnetic field 16 and is uniformly illuminated on its underside by a radiant microwave beam being directed through the waveguide 14.

According to the invention, the spin resonant mass 13 is characterized as being of a material, such as certain of the crystal materials or free radical materials that possess numerous uncoupled nuclei, electrons, or other subatomic particles therein that are free to migrate and orbit within the material providing numerous subatomic dipoles in the mass. Being electrically charged, the orientation and spin rates or energy condition of these dipoles are controlled by the intensity of the external magnetic field 16 according to the Zeeman energy relationship, whereby the magnetic field tunes or presensitizes the mass 13 to respond to a radiant microwave beam occurring at a frequency or frequencies corresponding to the intensity of the magnetic field 16.

Upon the radiant beam being conveyed to illuminate the mass 13, therefore, the mass 13 directly absorbs energy from the beam, in the manner of resonant circuits, and the energy being absorbed is reradiated from the mass 13 at different wavelengths, such as in the form of heat. This interaction between the magnetic field 16, radiant microwave beam, and spin resonance material to produce heat is known in the art and variously described in the literature and in a prior application of the same assignee, Serial No. 73,696, filed December 5, 1960, now Patent No. 3,137,003.

Thus, by means of the interaction between the magnetic field 16 and the radiant beam on the mass 13, the microwave beam is transduced or converted into a heat pattern in the mass. According to the invention, the intensity of the radiant beam, the mass material, and the other parameters involved are controlled such that the resonant condition of the mass 13 is not destroyed by the absorption of energy from the microwave beam. Consequently, the heat patterns are produced and will decay in the mass 13 corresponding to variations in the radiant beam being applied to the mass. In this manner, the continuous or discontinuous illumination of the same mass 13 by the radiant microwave beam produces a sequence of different heat patterns or images in the mass 13 corresponding to the illuminating microwave beam.

For recording these heat patterns or images, an elongated tape or record member 10 is continuously or continually passed through the recording zone intermediate the magnetic poles 17 and 18. On the underside of this tape 10, there is provided a layer of heat sensitive material 12, and in passing through the recording zone, this layer 12 is maintained to contact with, or otherwise in heat transferring relationship to the mass 13. Thus, the heat images being produced in the mass 13 are each transferred to different positions along the moving tape thereby to record the images or heat patterns on the tape. As is now believed evident, the heat patterns or images may alternatively be recorded by providing an elongated stationary heat sensitive tape 10 and moving the mass 13 into heat transferring relationship with different positions on the stationary tape 10.

As is discussed more fully in the copending application above referred to and in further copending applications of the same assignee, Serial No. 95,531, filed March 14, 1961, now abandoned, and Serial No. 59,342, filed September 29, 1960, the general phenomena of spin resonance absorption is known and a vast number of different type materials are available for use as the resonant mass 13 including the free radical materials, such as diphenylpicrylhydrazyl (DPPH) and many others, high intensity irradiated crystals, irradiated unsaturated hydrocarbons, semiconductors and many others. Such materials are available in either solid, liquid, or gaseous form. A number of such materials are stable at ambient or room temperature, such as DPPH referred to, which is obtainable in small solid particle form and therefore, may be easily provided in the shape of a coherent solid mass 13 as shown in FIG. 1 or FIG. 2. On the other hand, if it is desired to employ one of the spin resonant materials available in liquid or gaseous form, the mass of material may be enclosed within a closed container having walls of heat transferring material thereby enabling the transfer of the heat image to the tape. Thus, it is believed evident that the present invention is not limited to the use of any particular spin resonant materials.

With respect to the heat sensitive layer 12 supported on a suitable base 11 forming the tape 10, a vast number of such heat sensitive materials are also well known and presently available commercially under the general name of thermographic copy papers or sheets. On preparation producing a black color change of fairly good quality when exposed to elevated temperature is comprised of 30% of urea; 10% of nickel acetate; 3% of thiourea and 57% of water. This composition is applied in liquid form onto a suitable base stock of paper or the like by means of a dip-squeezing or flow coating process and dried to produce the usable heat sensitive tape or record. A vast number of other heat sensitive materials are also available that produce change of color with heat or otherwise vary their chemical or physical properties in a detectable manner when heated and accordingly this invention is not to be considered as limited to any specific heat sensitive material.

In many of these heat sensitive materials, the critical elevated temperature or temperature range required to effect a change in color or other desired change in the tape may be greater than can be obtained from the heat pattern produced by the resonant mass 13. In such instances, the tape 10 may be preheated in the recording zone, by means of a separate heating coil or the like (not shown), to just under this critical temperature or range. Upon the added application to the tape 10 of the heat pattern being produced in the resonant mass 13, the temperature of the tape at the discrete locations forming the desired pattern, is, therefore, sufficiently raised to exceed its critical temperature and thereby effect the recording of the heat image.

According to a preferred embodiment of the invention, it is also desired that the recorded images of the radiant beam be in the form of a frequency spectrum with each of the component frequencies of the beam occupying a different position in the recorded image. This is obtained by producing a nonuniform magnetic field 16 across the mass of resonant material 13 whereby each different position on the mass 13 received a different intensity magnetic field. Referring to FIG. 2, it is observed that one manner of obtaining such a nonuniform or nonhomogeneous magnetic field is by employing magnetic poles 17 and 18 having progressively diverging pole faces thereby to provide a steadily increasing air gap between the poles 17 and 18 from left to right. The intensity of the magnetic field at the left, where the poles are closest together, is, therefore, at the greatest intensity and the magnetic field progressively decreases in a direction across the mass 13 to the right hand side thereof.

As is generally discussed above, the resonant mass 13 is characterized as being frequency sensitive and is tuned or sensitized into absorptive relationship with a radiant microwave beam by the external magnetic field 16. The intensity of the magnetic field determines the frequency of resonance or absorption according to the Zeeman energy relationship, whereby the nonhomogenous field 16 being produced tunes each position transversely across the mass to respond or resonate at a different frequency. Thus, the radiant microwave beam is effectively separated into its different frequency components during the transducing process and each component is absorbed at a different position on the mass 13 to provide a frequency spectrum heat pattern across the surface of the mass 13. This heat pattern is transferred in the same configuration to the recording tape 10, thereby producing a series of spectral images along the length of the tape corresponding to the intelligence carried by the radiant beam.

Although but preferred embodiments of the process, apparatus and materials have been disclosed in compliance with the patent laws, it is believed evident that many further variations may be made without departing from the scope of the invention. For example, in the step of illuminating the tape with the radiant microwave beam, various other wave conveying or directing means may be substituted from the waveguide 14 as shown, including parallel line or coaxial transmission means, dipoles or other beam shaping antenna means and others. Similarly, in the step of applying the static magnetic field, various other configurations of electromagnets or permanent magnets may be employed, producing various patterns of homogenous or nonhomogenous fields, either continuously or discontinuously. Since these and many other changes may be made, this invention is to be considered as being limited only according to the following claims appended hereto.

What is claimed is:

1. A transducer for recording a radiant microwave beam comprising: a mass of spin resonant material occupying a dispersed spatial region corresponding in dimensions to the desired size of a recorded image, means for conveying a radiant beam to illuminate said mass over said region, means producing a magnetic field over said region to sensitize the mass into energy absorbing relationship with said beam, whereby said mass is conditioned to absorb energy from the beam and produce heat images corresponding thereto, and means for enabling said mass to be applied to different regions of heat sensitive material thereby to record said heat images.

2. In the transducer of claim 1, said conveying means directing a radiant beam to continuously illuminate said mass.

3. In the transducer of claim 2, said magnetic field producing means producing a nonhomogenous magnetic field over said mass to sensitize different positions on said region into energy absorbing relationship with different frequencies of the radiant beam.

4. In a recording apparatus, a stationary mass of spin resonance material occupying an extended surface region, means producing a nonuniform magnetic field over said surface region of material to tune different positions on said material into energy absorptive relation with different frequencies of a radiant microwave beam, means for conveying a radiant beam to uniformly illuminate said material over said region, and means for conveying a moving heat responsive record material into successive heat transferring contact with said mass thereby to record images of said radiant microwave beam.

5. A transducer for directly converting a time variable radiant microwave beam into a sequentially produced series of spatially dispersed spectral images thereof comprising a mass of spin resonant material occupying a spatial region corresponding in size to the desired image size, means producing a nonhomogenous magnetic field over said region of material of varying intensity to tune different positions on said mass to resonant absorption relationship with different radiant microwave beam frequencies, means for directing a microwave beam to be converted to continually illuminate said mass over said region thereby to produce a series of spatial heat images at said region each corresponding to the frequencies of the beam, and means for enabling the transfer of the heat images to different heat sensitive material regions to individually record the images.

6. In the transducer of claim 5, said transferring means including means for relatively moving a heat sensitive record with respect to said mass and in heat transferring relationship therewith, thereby to transfer said heat images to different regions of heat sensitive material thereby to record said heat images.

7. In a recording apparatus, a transducer for recording a radiant microwave beam, said transducer comprising a mass of spin resonant material occupying a dispersed spatial region, means for conveying a radiant beam to illuminate said mass over said region, means producing a magnetic field over said region to sensitize the mass into energy absorbing relationship with said beam, whereby said mass is conditioned to absorb energy from the beam and produce heat images corresponding thereto, and means for enabling said mass to be applied in heat transferring relationship to a separate heat responsive recording member thereby to record a heat image for each application thereof.

8. In the recording apparatus of claim 7, said heat responsive recording member comprising an elongated record, and said transducer being successively applied to different positions along the member to record a sequence of images of the microwave beam.

9. In a microwave transducing apparatus, a solid state transducer comprising a mass of spin resonant material occupying a dispersed spatial region, said material being characterized as being frequency tunable by a magnetic field and being responsive to said microwave signal to absorb energy therefrom and transduce the energy into heat energy patterns, means for continually energizing said mass to produce a series of such changing heat energy patterns corresponding to the time variations of the energizing signal, means for reading out the energy patterns from the mass for indicating the time variation of the microwave signal.

10. In the apparatus of claim 9, means for tuning different spatial positions of said mass to selectively absorb different frequency microwave signals at different positions of the mass, whereby said mass transduces the time variable microwave signal into a succession of frequency spectrum images each corresponding to the microwave signal at a different time.

11. A solid state transducer for time variable radio frequency signals comprising: a mass of spin resonant material occupying a dispersed spatial region, means for continually energizing said region in time sequence by the time variable radio frequency signal, and means for tuning said mass into energy absorptive relationship with said signal, said spin resonant material being characterized as absorptive of radio frequency energy from said signal to transduce the energy into a series of spatial heat images and means for repetitively reading out the heat images from the mass to indicate time variations of said radio frequency signal.

12. A solid state transducer for time variable radio frequency signals comprising: a mass of spin resonant material occupying a dispersed spatial region, means for continually energizing said region in time sequence by the time variable radio frequency signal, and means for tuning said mass into energy absorptive relationship with said signal, said spin resonant material being characterized as absorptive of radio frequency energy from said signal to transduce the energy into a series of spatial images at different wavelength of frequencies, and means for repetitively reading out the images from the mass to indicate time variations of said radio frequency signal, said read out means comprising a separate record member responsive to energy at said different wavelength of frequencies, and means for successively transferring the images to different positions on the record member to record separate images of the time variable radio frequency signal.

References Cited in the file of this patent
UNITED STATES PATENTS
2,952,503    Becker _____ Sept. 13, 1960